US00RE44433E

(19) United States
(12) Reissued Patent
Fong et al.

(10) Patent Number: US RE44,433 E
(45) Date of Reissued Patent: Aug. 13, 2013

(54) METHOD AND APPARATUS FOR A WIRELESS TETHER SYSTEM

(75) Inventors: Gordon D. Fong, Benicia, CA (US); Cuauhtemoc Perez, Benicia, CA (US); C. Bart Sullivan, Benicia, CA (US)

(73) Assignee: TV—Tether, LLC, Boulder, CO (US)

(21) Appl. No.: 13/100,454

(22) Filed: May 4, 2011

Related U.S. Patent Documents

Reissue of:
(64) Patent No.: 7,535,369
Issued: May 19, 2009
Appl. No.: 11/983,948
Filed: Nov. 13, 2007

U.S. Applications:
(63) Continuation of application No. 11/336,109, filed on Jan. 20, 2006, now Pat. No. 7,312,711, which is a continuation of application No. 10/655,788, filed on Sep. 6, 2003, now Pat. No. 7,061,385.

(51) Int. Cl.
*G08B 23/00* (2006.01)

(52) U.S. Cl.
USPC ..... 340/573.4; 340/573.1; 340/539.21

(58) Field of Classification Search
USPC ..... 340/573.4, 539.13, 539.15, 539.21, 340/539.23, 573.1, 573.3; 455/421, 134, 455/457
See application file for complete search history.

(56) References Cited

U.S. PATENT DOCUMENTS 4,593,273 A * 6/1986 Narcisse ..... 340/573.4
4,598,272 A * 7/1986 Cox ..... 340/539.21

(Continued)

*Primary Examiner* — John A Tweel, Jr.
(74) *Attorney, Agent, or Firm* — Lathrop & Gage LLP

(57) ABSTRACT

[Method and apparatus to provide a wireless tether system is described. In one embodiment, one or more wireless tether apparatuses are in wireless communication with one or more base units. A wireless tether apparatus may be configured such that when separated from a base unit greater than a predetermined distance, such a wireless tether apparatus provides information to the user of the wireless tether apparatus to aid a user such as a human, animal, or machine in finding their way back to a desired location. A predetermined distance may be configured to change over time to accommodate different tether distance requirements at different times, e.g., closer to a home location at night and further away from the home location during the day. In one aspect, wireless tether apparatuses and base units communicate using a plurality of different communication modes such that when one mode fails other modes are utilized to reestablish a connection therebetween. In another aspect of the present invention, a plurality of wireless tether apparatuses are wirelessly tethered together such that individual proximities are maintained but still allow a plurality of wireless tether apparatus users to move about in an expanded range. In one aspect, a wireless tether system is employed such that one or more wireless tether apparatuses may be dynamically assigned to a plurality of base stations to allow changes to wireless tether apparatus locations and distances. In another aspect, when wireless tether apparatuses leave a predetermined tether distance, one or more alerts may be broadcast from the wireless tether apparatuses indicative thereof to other wireless signal receivers in proximity thereto not normally used as wireless tether signal receivers] *Users are located to determine if the user is within, or has departed from at least one bounded area established about a geographic location. The bounded area may be defined by setting one or more distance boundaries from the geographic location. A base station may monitor the location of a wireless device in proximity of the user. If the wireless device departs from a bounded area, a message containing information configured to be understandable and convey meaning to the user and/or a third-party is sent to the wireless device and/or the third-party. For example, the message may be configured to communicate to the user and/or third-party information pertaining to the departure from the bounded area, location information, navigation directions, instructions, etc. The message sent may include text and/or other symbols.*

20 Claims, 6 Drawing Sheets

(56) References Cited

U.S. PATENT DOCUMENTS

| | | | | |
|---|---|---|---|---|
| 5,245,314 | A * | 9/1993 | Kah, Jr. | 340/539.13 |
| 5,337,041 | A * | 8/1994 | Friedman | 340/573.4 |
| 5,461,365 | A | 10/1995 | Schlager et al. | |
| 5,552,773 | A * | 9/1996 | Kuhnert | 340/573.1 |
| 5,661,460 | A * | 8/1997 | Sallen et al. | 340/573.4 |
| 5,731,785 | A * | 3/1998 | Lemelson et al. | 342/357.07 |
| 6,075,443 | A * | 6/2000 | Schepps et al. | 340/573.4 |
| 6,313,733 | B1 * | 11/2001 | Kyte | 340/573.1 |
| 6,353,390 | B1 * | 3/2002 | Beri et al. | 340/573.1 |
| 6,510,380 | B1 * | 1/2003 | Curatolo et al. | 340/572.4 |
| 6,529,131 | B2 * | 3/2003 | Wentworth | 340/573.1 |
| 6,552,661 | B1 * | 4/2003 | Lastinger et al. | 340/573.4 |
| 6,714,132 | B2 * | 3/2004 | Edwards et al. | 340/573.1 |
| 6,788,199 | B2 * | 9/2004 | Crabtree et al. | 340/539.13 |
| 6,888,464 | B1 * | 5/2005 | Maloney | 340/573.1 |
| 7,061,385 | B2 * | 6/2006 | Fong et al. | 340/573.4 |
| 7,071,814 | B1 * | 7/2006 | Schorman et al. | 340/539.1 |
| 7,312,711 | B2 * | 12/2007 | Fong et al. | 340/573.4 |

* cited by examiner

METHOD AND APPARATUS FOR A WIRELESS TETHER SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of and claims priority to U.S. patent application Ser. No. 11/336,109, entitled "Method And Apparatus For A Wireless Tether System" filed Jan. 20, 2006, now U.S. Pat. No. 7,312,711, *which is a continuation of U.S. patent application Ser. No. 10/655,788, entitled "Method and Apparatus For a Wireless Tether System", filed Sep. 6, 2003, now U.S. Pat. No. 7,061,385, all of* which [is] *are* hereby incorporated by reference in [its] *their* entirety for all purposes.

BACKGROUND OF THE INVENTION

1. Field of the Invention

Embodiments of the present invention generally relate to wireless communication devices and more specifically to providing a wireless tether between two or more wireless communication devices.

2. Description of the Related Art

Generally, there is a need for improved personal security and safety. In situations where young children are lost or, wander away, persons having a memory condition such as Alzheimer's disease wander away or forget where they are, groups traveling together get separated, etc., the consequences can be disastrous.

Currently, people and animals may be located using technologies such as global positioning systems, wireless triangulation, wireless proximity sensors, and others. However, these systems are often complicated devices and have limitations with regard to where and how they may be used. For example, a global positioning system may be entirely too complicated for a three year old child to operate. Furthermore, if the child is lost in a subway tunnel for example, the transmission of the GPS signal may fade rendering the GPS system useless except to indicate the last general location of the GPS receiver. Further, once a limited intellect being such as a child move outside a given geographic location they may be Unaware of their location or surroundings. Even if aware, limited intellect patients may be unsure what to do. This may be especially the case for patients of Alzheimer's who may have a tendency to wander away and may not remember who they are, or where they are located. Therefore, if a tracking signal is lost the result could be serious if the systems monitoring the tracking signals cannot find the lost patient, child, animal, etc.

Prior art tracking and alarm systems such as exemplified in U.S. Pat. No. 5,731,785 disclose alarms and tracking systems that for the most part suffer from several deficiencies with regard to system failures, loss of signal, and adaptability to changing communication circumstances. For example, if a signal is lost between a tracking and alarm system transmitter and receiver due to transmission perturbations while within the operating range of the system, false alarms may occur. In regards to animal tethering devices, for example, a wireless animal tether may work adequately to keep an animal within a particular radius about a transceiver, but if the wireless environment changes, the wireless tether may cause a false alarm condition unduly submitting the animal owner to undue stress. Further, prior art wireless tethers used for animals may be configured to simply inflict pain to an animal once such an animal has exceeded a wireless boundary or the wireless signal is compromised. Thus, if an animal moves into a bad reception area within a radius of a transceiver in communication with the transmitter on the animal, the communication link between the animal and transceiver may be lost thereby causing a false alarm even though the animal is within the radius causing pain and possibly injury to the animal. Still further, once an animal is outside a boundary, an animal may be confused and may do anything it can to avoid the pain. Therefore, such animal may continue to move away from the boundary looking for relief thereby becoming further lost and perhaps a danger to others.

Therefore, what is needed is a method and apparatus to provide a wireless tether system that adapts to changing transmission environments and provides usable information to users of the wireless tether system to facilitate safety and security.

SUMMARY OF THE INVENTION

An aspect of the present invention is a method of wirelessly tethering one or more devices to one another. The method includes providing wireless communication associated with at least one predefined distance between at least one device to at least one other device, and determining if the at least one device and the one other device have exceeded the at least one predefined distance. If the at least one predefined distance has been exceeded, then providing informational instructions on the at least one other device to a user thereof.

An aspect of the present invention is a method of providing at least one wireless boundary about one or more locations using at least one wireless signal-receiving device. The method includes receiving at least one boundary signal at the at least one wireless signal-receiving device and determining if the at least one wireless signal-receiving device is within the at least one boundary about the one more locations. If the at least one wireless signal-receiving device is not within the boundary, then outputting instructions from the at least one wireless signal-receiving device indicative thereof to one or more users to facilitate movement of the at least one wireless signal-receiving device back within the at least one boundary.

An aspect of the present invention is a wireless tethering system. The wireless tethering system includes at least one wireless tether device configured to receive and process wireless tether signals. The wireless tethering system also includes a data processor responsive to the wireless tether signals, wherein if the wireless tether device exceeds at least one predetermined distance threshold from at least one predetermined location, the data processor provides predefined information indicative thereof to one or more users of the at least one wireless tether device.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION OF THE PREFERRED EMBODIMENT

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention. For purposes of clarity, the present invention is generally described in terms of use with intellectual beings such as humans. However, it is contemplated that aspects of the present invention may be used with limited intellectual beings such as animals or even machines such as robots.

Aspects of the present invention are described in terms of communication system such as wireless telephonic communication systems, wireless communication systems such as defined in IEEE 802.11, and wireless networks such as Wireless Local Area Networks (WLAN). However, it is understood the present invention is not limited to any particular wireless communication system or network environment.

As will be described below, aspects of one embodiment pertain to specific method steps implementable on computer systems. In one embodiment, the invention may be implemented as a computer program-product for use with a computer system. The programs defining the functions of at least one embodiment can be provided to a computer via a variety of computer-readable media (i.e., signal-bearing medium), which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disk drive); or (iii) information conveyed to a computer by communications medium, such as through a computer or telephone network, including wireless communication. The latter specifically includes information conveyed via the Internet. Such signal-bearing media, when carrying computer-readable instructions that direct the functions of the invention, represent alternative embodiments of the invention. It may also be noted that portions of the product program may be developed and implemented independently, but when combined together are embodiments of the invention.

Figure 1:
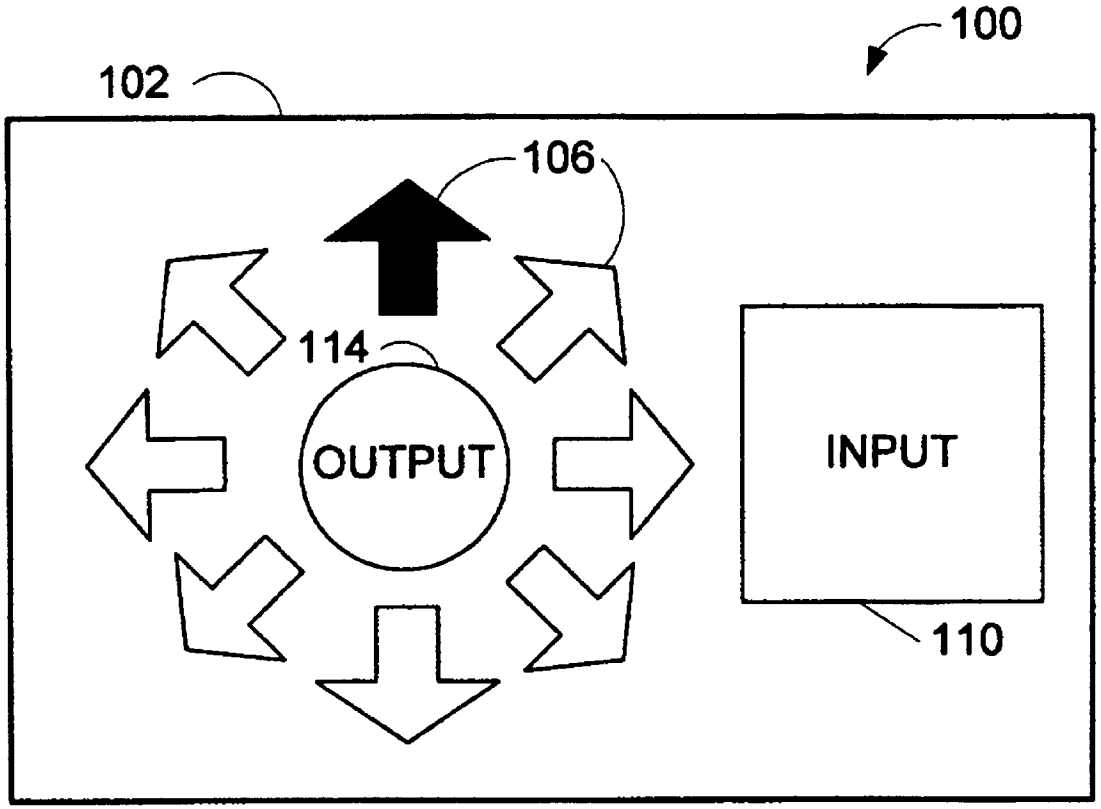
FIG. 1 is a top view illustrating one embodiment of an exemplar wireless tether apparatus in accordance with one or more aspects of the present invention.

FIG. 1 is a top view illustrating one embodiment of an exemplar wireless tether apparatus 100 in accordance with one or more aspects of the present invention. Wireless tether apparatus 100 includes body 102. Body 102 is made of a plurality of materials such as plastic, metal, and the like. Body 102 includes direction displays 106. Direction displays 106 may be used to give direction to a user of wireless tether apparatus 100. Direction displays 106 may be of virtually any display type configured to indicate a direction. For example, such direction displays 106 may be a display monitor, a compass type display, and the like, configured to direct a user in a given direction. In one aspect, direction displays 106 may include lights such as LEDs, and the like, to illuminate a direction. In another aspect, direction displays 106 may output sound of vibration to direct a user such as a blind person. For example, a low pitch may emit that increases in pitch as a user moves wireless tether 100 in a predetermined direction.

In another aspect of the present invention, wireless tether apparatus 100 includes an input device 110 and output device 114. Input device 110 can be any device adapted to give input to wireless tether 100. For example, a keyboard, keypad, light-pen, touch-screen, track-ball, or speech recognition unit could be used. Output device 114 is preferably any conventional display screen or speaker configured to provide information such as text, graphical displays, and the like, and may be integral with direction display 106. Output device 114 may also be a stereophonic device configured to provide stereophonic sound such as stereo, surround sound, and the like, to an animal or human user. This may be especially useful if sound is being used to direct a limited intellect being such as a very young child,.animal, and the like, in a given direction. In a particular embodiment, the output device is a display screen of limited area, such as a display screen used on portable handheld devices. Although shown separately from the input device 110, the output device 114 and input device 110 could be combined. For example, a display screen with an integrated touch-screen, and a display with an integrated keyboard, or a speech recognition unit combined with a text speech converter could be used.

Figure 2:
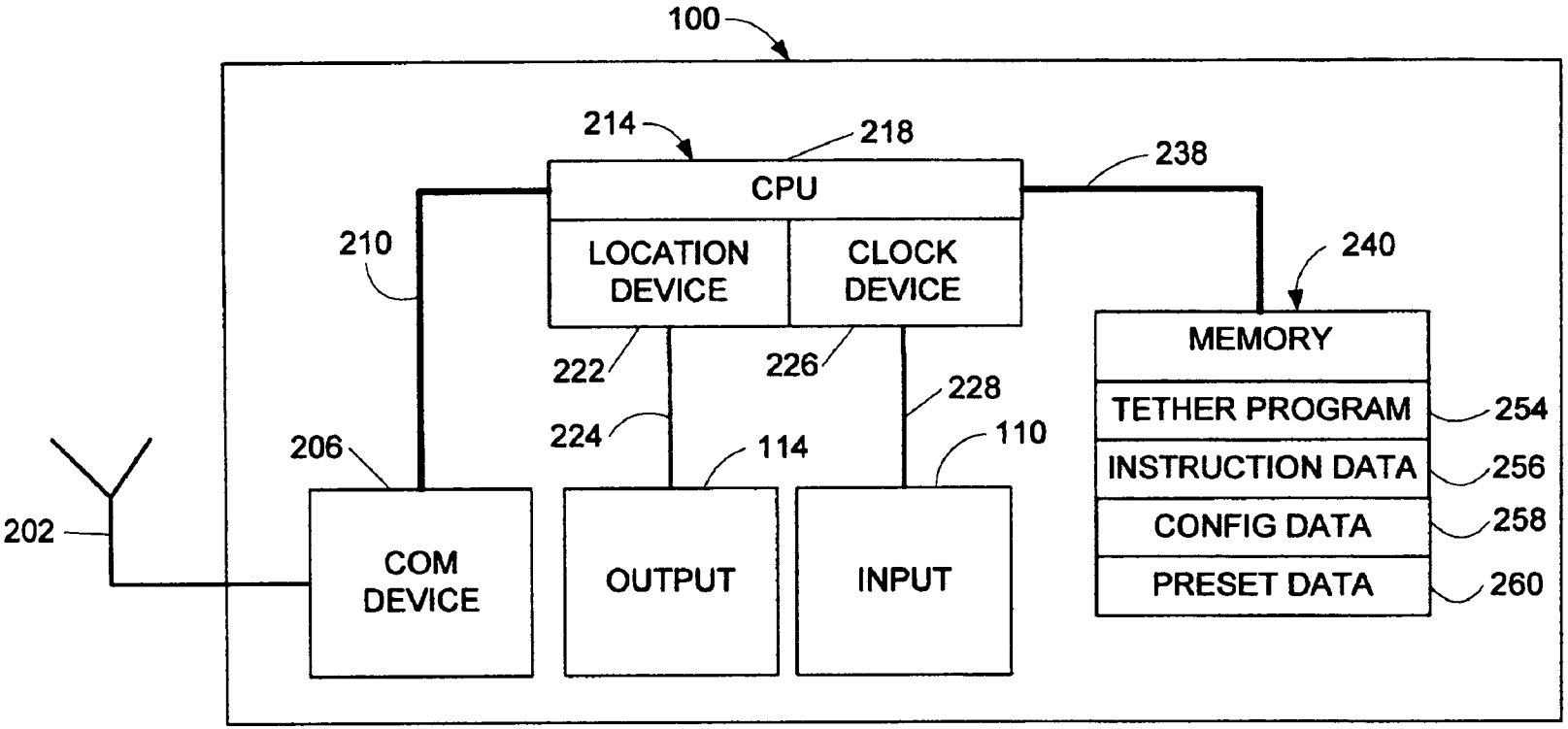
FIG. 2 is a high-level schematic diagram of a wireless tether apparatus of FIG. 1 in accordance with one or more aspects of the present invention.

FIG. 2 is a high-level schematic diagram of one embodiment of a wireless tether apparatus 100 (i.e., wireless tether) of FIG. 1 in accordance with one or more aspects of the present invention. Illustratively, wireless tether 100 includes antenna 202 coupled to a communication device 206. Communication device 206 may include a variety of various communication devices such as receivers, transmitters, transceivers, and the like, configured to receive and process communication signals. Communication device 206 may be configured to process a plurality of wireless communication signals such as radio signals, light signals, infrared signals, and the like. Communication device 206 may be configured to process a plurality of other types of wireless communication signals such as audible signals, vibration signals, and the like. Communication device 206 is configured to output data in response to signals received thereto on data bus 210. Such data may be of a plurality of data types such as digital data, analog data, and the like.

Wireless tether apparatus 100 includes data processing circuit 214. In one aspect of the present invention, data processing circuit 214 includes clock device 226, Central Processing Unit (CPU) 218, and Location device 222. Data processing circuit 214 may be configured to receive and processes data from data bus 210. Data processing circuit 214 provides an output signal 224 to output device 114. Data processing circuit 214 receives an input signal 228 from input device 110.

Clock device 216 may be configured using virtually any timing circuitry. For example, clock device 216 may include digital counter circuits configured to sequentially count in response to an oscillator circuit (not shown) coupled thereto.

Location device 222 may include a plurality of location determining circuits, for example, Location device 222 may include a compass, a global positioning system (GPS), triangulation circuitry, and the like. In one aspect, location device 222 utilizes one or more location determining circuits to ascertain location. Location device 222 may be configured to determine one or more directions of motion of wireless tether 100 relative a fixed direction such as magnetic north. Location device 222 may be configured to work independently of communication device 206. For example, location device 222 may be a GPS receiver configured to receive and process GPS signals.

In one aspect of the present invention, data processing circuit 214 is coupled to memory 240 via bus 238. Memory 240 is preferably random access memory sufficiently large to hold the necessary programming and data structures located on the wireless tether 100. While memory 240 is shown as a single entity, it should be understood that memory 240 may in fact comprise a plurality of modules, and that memory 240 may exist at multiple levels, from high speed registers and caches to lower speed but larger DRAM chips.

Illustratively, memory 240 may include a tether program 254 that, when executed on CPU 218, may provide information to a user of wireless tether 100 as described below. Tether program 254 may be configured to provide a plurality of functions such as searching for tether communication signals, determining information to display, determining direction of travel, determining sound information, etc., described in more detail below. Tether program 254 may use any one of a number of different programming languages. For example, the program code can be written in PLC code (e.g., ladder logic), a higher-level language such as C, C++, Java, or a number of other languages. While tether program 254 may be a standalone program, it is contemplated that tether program 254 may be combined with other programs.

Memory 240 may include a plurality of instructional data 256. Instructional data 256 may be used to provide meaningful instructions to a user of wireless tether 100 and someone in the proximity thereof. Instructions may be selected from a plurality of instructions and instruction types pertaining to a user or location. For example, for a lost young child instructions may include audio or visual messages such as "tell someone you are lost", "ask for help", "go back", and the like. In another example, instructions may include advice to a medical patient who has had a memory lapse to return to a specific room number if they stray too far from the room. In one aspect, instructions may be designated messages for another party such as a bystander. For example, if a child was lost a wireless tether 100 used by the child may emit instructions such as "help, I am lost" from output device 114 so others in proximity may hear the message. Instructions may be used to also convey a health condition. For example, if a diabetes patient were lost and was in a diabetic coma, wireless tether 100 may be configured to emit instructions such as "I am lost and have diabetes, call 911". In one case, the instructions provided by wireless tether 100 may be in response to information from location device 222 to help the user return to within a predefined perimeter or location. For example, if a user was going north and need to return to the south, wireless tether 100 may provide information to a user such as "turn around" and then indicate "you are going in the right direction" when location device 222 determines the direction of the user's travel is in the correct direction. This may be especially important for people who may not be able to see the direction displays 106. While instructions are described in terms of verbal or textual instructions, it is contemplated that instructions may be of virtually any form that conveys meaning to one or more users or systems responsive to such instructions. For example, instructions may be in the form of alarms, sounds, displays, vibration sequences, and the like. Instruction may also be in the form of graphical map displays and other types of map information that graphically conveys a location. In one aspect of the present invention, in addition to or in lieu of stored instructions, wireless tether 100 may obtain a plurality of instructional information such as maps from networks such as the Internet.

In one aspect, for limited intellect beings such as animals, instructional data 256 may include audible instructions they understand. If the animal is used to a certain sound that reminds them to go to a specific location, the wireless tether 100 may emit one or more types of instructions to the animal to help direct such animal. For example, a wireless tether 100 may emit to a dog a prerecorded sound of the owner saying "Come home" recognized by such a dog as a command to come home. In one case, using output device 114, surround sound may be used to help direct an animal as well by either providing a sound they want to avoid or move toward. For example, consider the case where sheep are being directed to go in a southerly direction, wireless tether 100 may emit a sound seemingly coming from the north of barking dogs which then may cause the sheep to go in a southern direction to avoid the barking dogs. In one aspect, it is contemplated that the sound volume and configuration may be adjusted accordingly to how urgently the animals need to move in a desired direction. For example, a very loud barking dog sound may be used to initiate a movement of sheep in a desired direction, and then be lowered as such sheep move in such a desired direction and distance. Conversely, a desirable sound such as a dinner bell may be used as well to entice animals in a desired direction. For a machine, such as a robot designed to roam an area, wireless tether 100 may be used to help keep the machine within a predefined distance of the base station without the use of external sensors used by the robot to keep within the designated area by providing instructions indicative of the tether boundary to the robot.

Memory 240 may include a plurality of configuration data 258. Configuration data 258 may be used to configure wireless tether 100 for operational modes examples of which are described below. While, configuration data 258 is used generally to set a mode of operation input by a user of wireless tether 100, configuration data 258 may be used to set other parameters not generally accessible to users. For example, configuration data may include GPS frequencies, radio station frequencies, communication scanning rates, and other types of communication information such data packet loss, bit error rate (BER), jitter, and the like.

Memory 240 may include a plurality of preset data 260. Preset data 260 may be used to configure wireless tether 100 for one or more operational modes examples of which are described below as default operational mode(s). This allows users to configure wireless tether 100 with one or more preferred default settings.

OPERATIONAL EXAMPLES

Figure 3:
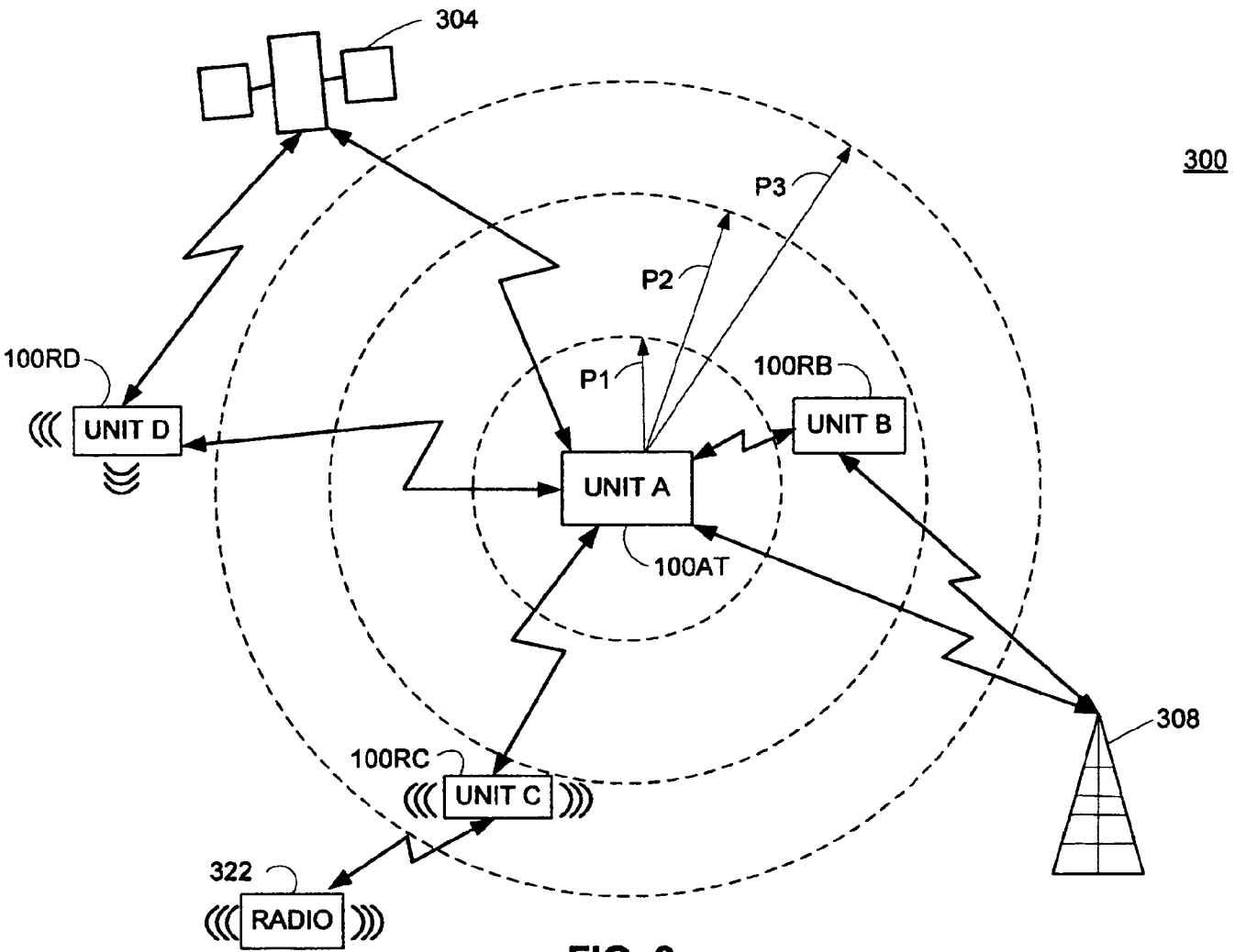
FIG. 3 is a high-level operational illustration of one embodiment of a wireless tether system in a base mode in accordance with one or more aspects of the present invention.

FIG. 3 is a high-level operational illustration of one embodiment of a wireless tether system 300 in a base configuration in accordance with one or more aspects of the present invention. For purposes of clarity, wireless tether system 300 illustrates only four wireless tethers 100, however a plurality of wireless tethers 100 may be used.

Base Mode

In one aspect, wireless tether 100 is configured to a wireless tether transmitter 100AT. Wireless tether transmitter 100AT may be configured to transmit one or more signals to at least one wireless tether 100 configured as a wireless tether receiver 100RB-RD. In this configuration, wireless tether transmitter 100AT is used as a base transmitter, e.g., base station. Wireless tether system 300 may be configured to establish one or more wireless perimeters (three are shown) P1-P3 extending from wireless tether transmitter 100AT. For example, perimeter P2 may be a boundary for wireless tether receivers 100RB and 100RC, perimeter P3 may be a boundary for wireless tether receivers 100RD, and so forth. Wireless tether receivers 100RB-RD may be-configured to receive and respond to predetermined signals transmitted thereto. In one aspect of the present invention, wireless tethers 100RB-RD provide one or more external responses such as vibration and sound to signal users thereof if communication exceeds distance thresholds from wireless tether receiver 100AT.

Time Mode

In one aspect of the present invention, clock device 226 may be used to establish time references for virtually any mode of operation some of which are described herein. For example, perimeter P1 may be adjusted to different perimeter values over time. Consider the case where wireless tether receiver 100RB is being used to keep a group of children within a given distance, time mode may be used to shrink perimeter P1 to a smaller value over time such that the children eventually arrive back at the base station unit 100AT at predetermined time. This may be especially useful where a group is given more freedom to roam farther apart at one time but needs to be closer together at a different time.

It is contemplated that time may be used to change modes of operation as desired. For example, time mode may be set such that one-way communication is used for a predetermined time and then is set to two-way communication. For example, a hiker is using one-way mode to help them keep within a given area, after a predetermined time a wireless tether 100 may be set to two-way communication mode so that the base station can make sure that the hiker is still within a predetermined area.

Time mode may be configured such that wireless tether 100 has different response rates as desired for one or more modes of operation. Time mode allows a user to set the sensitivity of operation to further avoid false alarms. For example, consider the case were a teenager has gone outside a given perimeter P1. Time mode may be set to allow the teenager to travel back into perimeter P1 before activating other more severe alerts such as a distress alert or alert a base station such as wireless transmitter 100AT.

Warning Mode

In one aspect, perimeters P1-P3 may be set such that when at least one wireless tether 100RB-RD passes at least one boundary P1-P3, a warning alert may be provided therefrom. For example, as illustrated in FIG. 3, wireless tether receiver 100RC may be set to stay within perimeter P2. As illustrated, wireless tether receiver 100RC provides an alert when it is positioned beyond perimeter P2. Such an alert may instruct a user of wireless tether receiver 100RC that a perimeter P2 has been exceeded. In this case, such a user may not be lost but rather has gone beyond a predetermined distance from wireless tether transmitter 100AT, e.g., P2. For the case of a limited intellect being such as an animal, the warning may be a series of directional tones or sounds they understand. For example, consider the case where a herd of sheep are wandering together and go beyond a specific part of the grassland that the sheep owner wants them to stay within without using fences. A directional tone or sound could be used to direct sheep within a specified area and direction of travel.

Transmit Alert Mode

In one embodiment, one or more wireless tether receivers 100RB-RD may be set to transmit alert signals to wireless tether transmitter 100AT and other receivers in proximity thereto. For example, consider the case where radio receiver 322 is in reception range of wireless tether receiver 100RC. When wireless tether receiver 100RC exceeds a predetermined perimeter, e.g., P1-P3, wireless tether receiver 100RC may be configured to send an alert using a plurality of frequencies associated with radios such as AM radios, FM radios, and the like, to alert users of such radios that wireless receiver 100RC has exceeded a boundary threshold. This mode is especially useful where a limited intellect person such as a very young child or an animal, is lost in a remote area that may be inaccessible to other forms of communication such as cellular radio and satellite transmission. Thus, for example, during a search and rescue operation, transmit alert mode may allow others to join in such a search and rescue operation that normally would not know or be part of such a search and rescue operation.

Alternative Signal Receive Mode

In another aspect of the present invention, one or more wireless tether receivers 100RB-RD may be set to receive signals from other transmitters in addition to wireless tether transmitter 100AT. For example, as illustrated in FIG. 3, wireless tether receivers 100RB and 100RD may be configured to receive signals from transmitter 308 and satellite 304 respectively. Transmitter 308 may be virtually any type of transmitter configured to communicate with wireless tether receivers 100RB-RD. For example, transmitter 308 may be a cellular transmitter, microwave transmitter, FM radio transmitter, AM radio transmitter, WAN wireless link, wireless transmitters configured to wireless standards such as IEEE 802.11, and the like. In one aspect, alternative transmitters may be used to expand one or more perimeters P1-P3 outside wireless tether transmitter 100AT range. For example, wireless tether transmitter 100AT may have a limited range due to local terrain, e.g. a mountainous region. Transmitter 308 may be configured to broadcast tether signals to one or more wireless receivers 100RB-RD. In one case, satellite 304 may be used to cover an even wider range due to its location in space.

In one aspect, when wireless tether receivers 100RB-RD are outside their predetermined perimeters external communication systems such as transmitter 308 and satellite 304 may be used. In this aspect, wireless tether receivers 100RB-RD may be configured to send a different set of instructions to wireless tether users. For example, when a tether user leaves a predefined perimeter or travels beyond a range of wireless tether transmitter 100AT, wireless tether receivers 100RB-RD may receive other tether signals from transmitter 308 and satellite 304. Once outside such predefined perimeters, one or more wireless tether receivers 100RB-RD are responsive to such transmitter 308 and satellite 304 signals.

Consider the case where before receiving such other tether signals a wireless tether 100RB-RD is providing instructions to a user to go back towards wireless tether transmitter 100AT, when such other wireless tether signals are received, new instructions may be provided to such a user instructing the user to go in the same direction, or in a new direction, etc. This is especially useful when a user for example wanders outside a range of wireless tether transmitter 100AT but is in range of another transmitter such as transmitter 308. Similarly, satellite 304 may be a GPS satellite and transmit GPS signals, wireless tether receivers 100RB-RD may use such GPS signals to instruct users to do different actions such as walk toward a landmark. For instance, consider the case where GPS signal data includes the location of a landmark such as a ranger station in proximity to a tether user, a wireless tether receivers 100RB-RD may provide such a tether user instructions to move in the direction of such a ranger station. Wireless tether receivers 100RB-RD may also provide additional instructions to such a user thereof if a transmitter 308 is in two-way communication. For example if wireless tether receiver 100RB-RD is in communication with a third party, such as a ranger, using transmitter 308, wireless tether receiver 100RB-RD may provide a tether user instructions such as "stay put", "find shelter", and so forth, or even may allow such third party and tether user to communicate directly through input device 110 and output device 114.

Wireless Tether Scan Mode

In one aspect of the present invention, at least one wireless tether receivers 100RB-RD may be configured to scan for different tether signal frequencies and types of tether signals. Tether signals may include a plurality of wireless communication signals such as radio signals, light signals, infrared signals, and the like. In such a scan mode, at least one wireless tether receiver 100RB-RD may scan to find such other forms of wireless communication signals. Scan mode is especially useful to minimize false alarms. For example, if a first Radio Frequency (RF) is being attenuated due to environment, another frequency less affected by the environment may be used. Similarly, different types of tether signals may be scanned for and used. For example, if a plurality of RF signals are being used as a tether signal but are not working due to a highly interfering environment such as near other RF sources, other types of tether signals such as sound and light may be used to establish a wireless tether communication link. In one embodiment, wireless tether receivers 100RB-RD may scan for other tether signal transmissions transmitted from other transmitters such as transmitter 308 and satellite 304.

Wireless Chain-Link Mode

Figure 4:
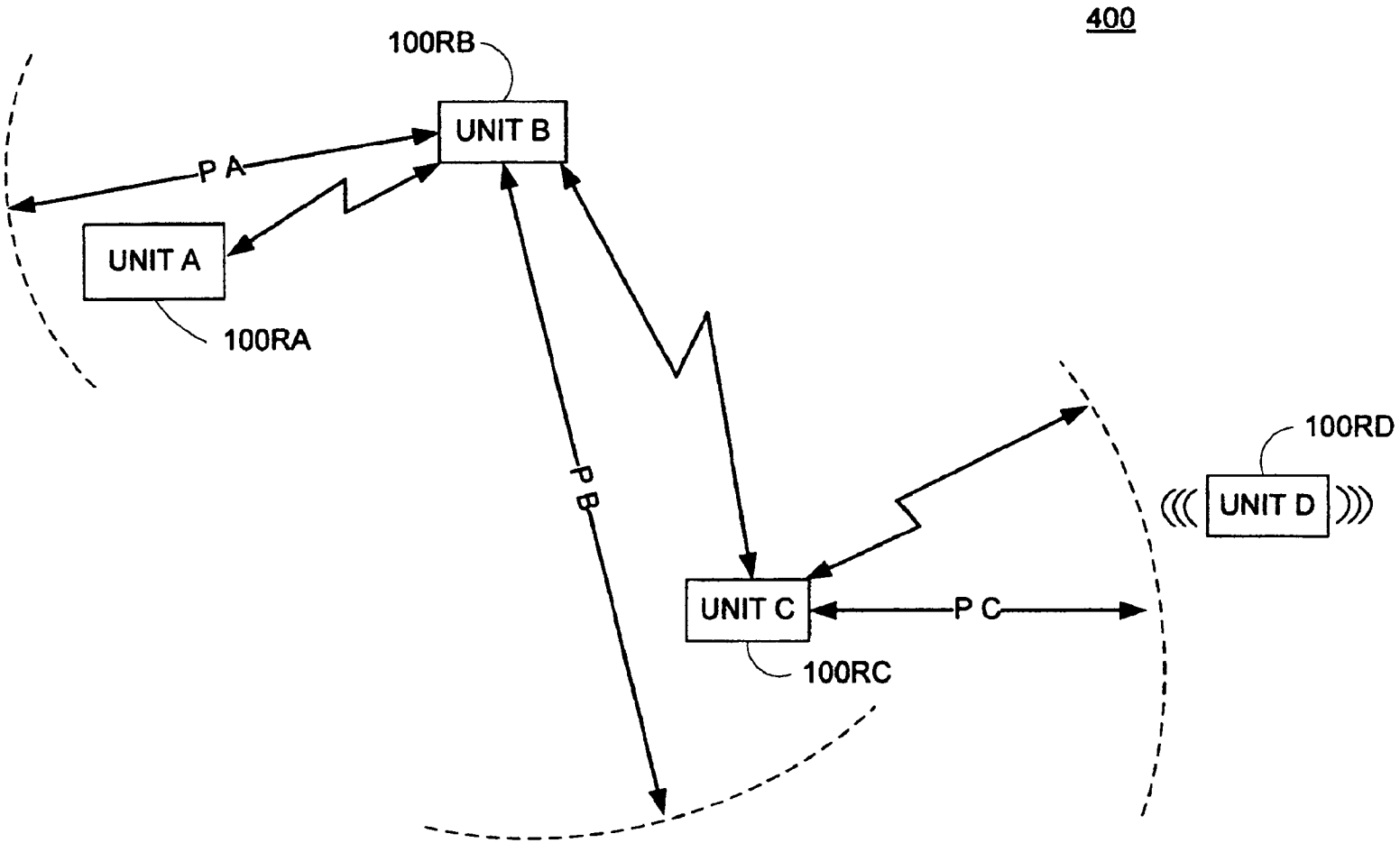
FIG. 4 is a high-level operational illustration of one embodiment of a wireless tether system in a chain-link configuration in accordance with one or more aspects of the present invention.

FIG. 4 is a high-level operational illustration of one embodiment of a wireless tether system 400 in a chain-link configuration in accordance with one or more aspects of the present invention. In chain-link mode each wireless tether receivers 100RA-RD are configured as a transceiver in communication with at least one other wireless tether receivers 100RA-RD. Chain-link mode allows one or more wireless tether receivers 100RA-RD to be coupled in a chain such that distances between communicating pairs of wireless tether receivers 100RA-RD is less than an overall distance allowable by a group of wireless tether receivers 100RA-RD. As illustrated in FIG. 4, wireless tether receiver 100RA is in communication to wireless tether receiver 100RB; wireless tether receiver 100RB is in communication with wireless tether receiver 100RC; and wireless tether receiver 100RC is in communication with wireless tether receiver 100RD. Each communicating pair of wireless tether receivers 100RA-RD, have a perimeter PA-C defining a predefined distance apart. For example, a perimeter between wireless tether receiver 100RA and wireless tether receiver 100RB is PA. Similar to an ice skating people-chain, in chain-link mode if each wireless tether receiver 100RA-RD were aligned such that communicating pairs were in a single line, e.g., wireless tether receiver 100RA then wireless tether receiver 100RB, then wireless tether receiver 100RC, then wireless tether receiver 100RD, the overall distance between wireless tether receiver 100RA and wireless tether receiver 100RD is greater than any one of perimeters PA-C. The following formula defines a maximum overall distance of a chain:

$$\text{Maximum Overall Distance}=PA+PB+PC \quad (1)$$

While only three perimeters are shown, it is contemplated that virtually any number of communication pairs of wireless tether receivers 100RA-RD may be used to create a virtually unlimited overall distance. Such a chain-link mode is especially useful in rescue missions where rescuers must maintain a distance from one another in a chain. In the case where the distance between each communicating pair of wireless tether receivers 100RA-RD is important, perimeters PA-C may be configured with different perimeters such as shown in FIG. 3, to provide preset distance thresholds. For example, if each communicating pair had an inner perimeter and outer perimeter threshold, an alert may be provided by a wireless tether receiver 100RA-RD when a rescuer moves too close or too far from another rescuer and violates either perimeter threshold.

Illustratively, if one or more communicating pair of wireless tether receivers 100RA-RD move outside their associated perimeters PA-C instructions will be provided to a user. For example as illustrated in FIG. 4, if wireless tether receiver 100RD moves beyond perimeter PC, an alert will be provided to user of wireless tether receiver 100RD.

Figure 5:
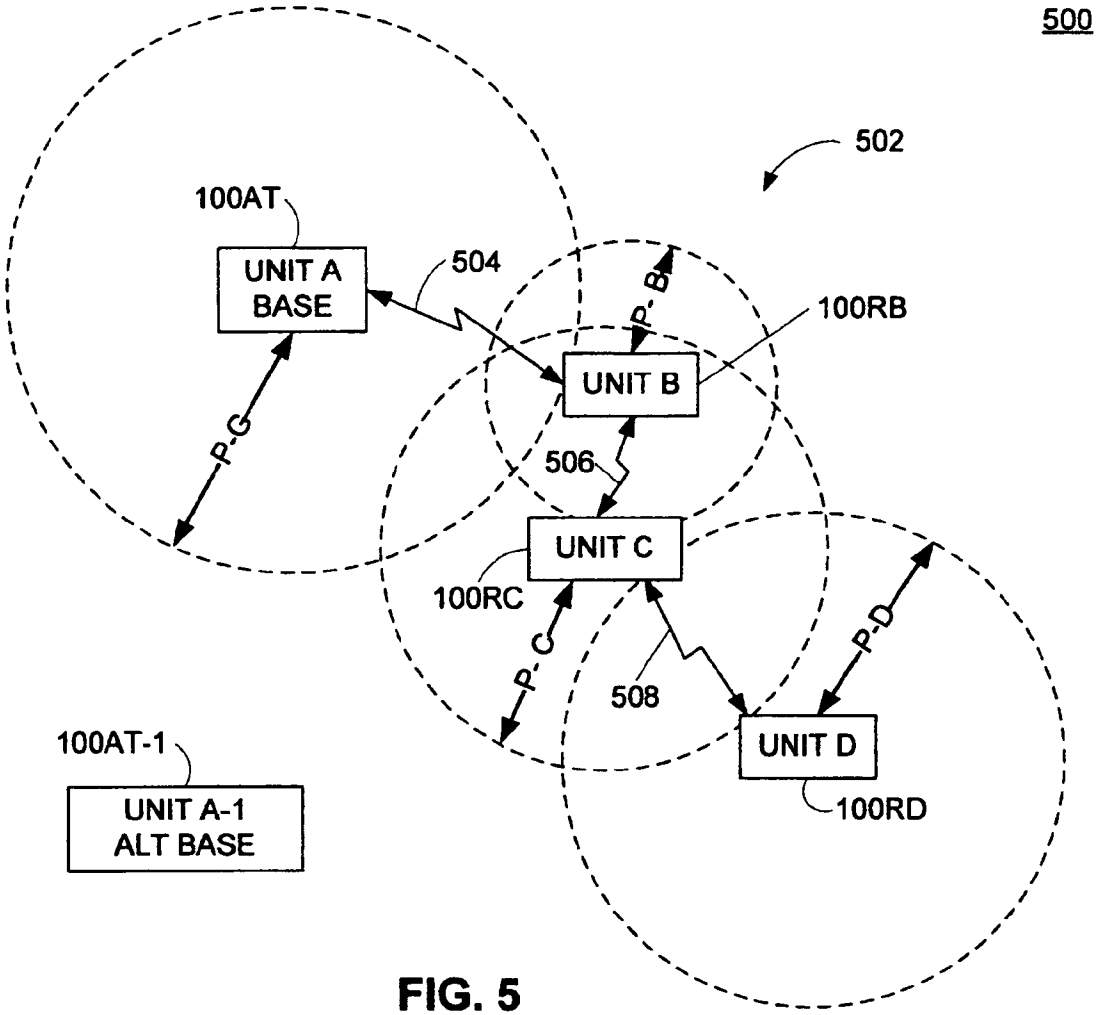
FIG. 5 is a high-level operational illustration of one embodiment of a wireless tether system in a group-link configuration in accordance with one or more aspects of the present invention.

FIG. 5 is a high-level operational illustration of one embodiment of a wireless tether system 500 in a group-link configuration in accordance with one or more aspects of the present invention. As illustrated in FIG. 5, one or more wireless tether receivers 100RB-RD are in communication with each other forming a wireless tether group 502. Wireless tether group 502 may communicate via one or more wireless tether receivers 100RB-RD to wireless tether transmitter 100AT. Illustratively, wireless tether transmitter 100AT is in communication with wireless tether group 502 via tether signal 504. In one aspect, group-link configuration 500 may be configured such that wireless tether receivers 100RB-RD are configured to only receive tether signals from wireless tether group 502 and wireless tether transmitter 100AT, or may be configured for two-way communication to each other and wireless tether transmitter 100AT.

In this operational illustration, wireless tether group 502 has at least one predetermined group perimeter P-G from wireless tether transmitter 100AT. In this mode, there are at least two constraints that are implemented to keep wireless tether group 502 together and within such a group perimeter P-G; at least one wireless tether receiver 100RB-RD must be within a group perimeter P-G, and each wireless tether receiver 100RB-RD must be within a predetermined perimeter relative one another. In one aspect, each wireless tether 100 has their own perimeter associated with one or more other wireless tethers 100 defining such a wireless tether group 502. In one operational aspect, wireless tether receiver 100RB is in communication with wireless tether receiver 100RC via tether signal 506, and wireless tether receiver 100RC is in communication with wireless receiver 100RD via tether signal 508. Illustratively, the maximum distance apart between wireless tether receiver 100RB and wireless tether receiver 100RC is P-B. The maximum distance apart between wireless tether receiver 100RC and wireless tether receiver 100RD is P-C. As long as at least one wireless tether receiver 100RB-RD remain within P-G wireless tether group 502 may move about freely within their respective perimeters P-B and P-D. The maximum distance apart that the group may stray is similar to chain-link mode when wireless tether receivers 100RB-RD are about in a straight-line relative wireless tether transmitter 100AT.

For the case of a limited intellect being such as an animal, the wireless tether group 502 may be used to herd animals. For example, consider the case where sheep are wandering together in a herd. A directional tone or sound could be used to direct such herd of sheep within a predetermined group perimeter P-G. In addition, the group perimeter P-G may be adjusted over time using time mode described herein to slowly corral sheep within a final group perimeter P-G. In one aspect, it is contemplated that animals such as sheep could be moved from place to place by assigning a different wireless tether transmitter 100AT-1 to wireless tether group 502. Thus, in this a group-link configuration 500 wireless tether receivers 100RB-RD may act as "wireless" sheep dogs helping to dynamically herd animals into a plurality of predetermined grazing locations while maintaining a predetermined herd formation size.

In one aspect, in a group communication configuration, where at least one wireless tether receivers 100RB-RD is within a group perimeter P-G, group status may be shared by some or all members of the wireless tether group 502. In this case, if a member of wireless tether group 502 goes beyond its predetermined perimeter, e.g., P-B, members of wireless tether group 502 are alerted and the straying member of wireless tether group 502 may be given instructions such as "return to the group". In base station communication configuration where at least one wireless tether receivers 100RB-RD is within group perimeter P-G, the status of each wireless tether receivers 100RB-RD of wireless tether group 502 is relayed from the wireless tether receivers 100RB-RD outside P-G though the at least one wireless tether receivers 100RB-RD within group perimeter P-G. In such a mode, base station, i.e., wireless tether transmitter 100AT, may be alerted that a member of wireless tether group 502 is outside its predefined perimeter. In this case, such a straying member may be giving similar instructions as above such as "return to the group".

In summary, group-link configuration 500 is used to assign an overall group perimeter P-G to a group of wireless tether receivers 100RB-RD where each member of wireless tether group 502 is also required to maintain a preset distance from one or more members of wireless tether group 502, e.g., P-B. Such a mode of operation may be especially useful when a group such as travelers, for example, need to be kept together as they travel from a base area such as a base camp. This mode may also be useful to keep a herd of animals together and moving a desired direction.

Figure 6:
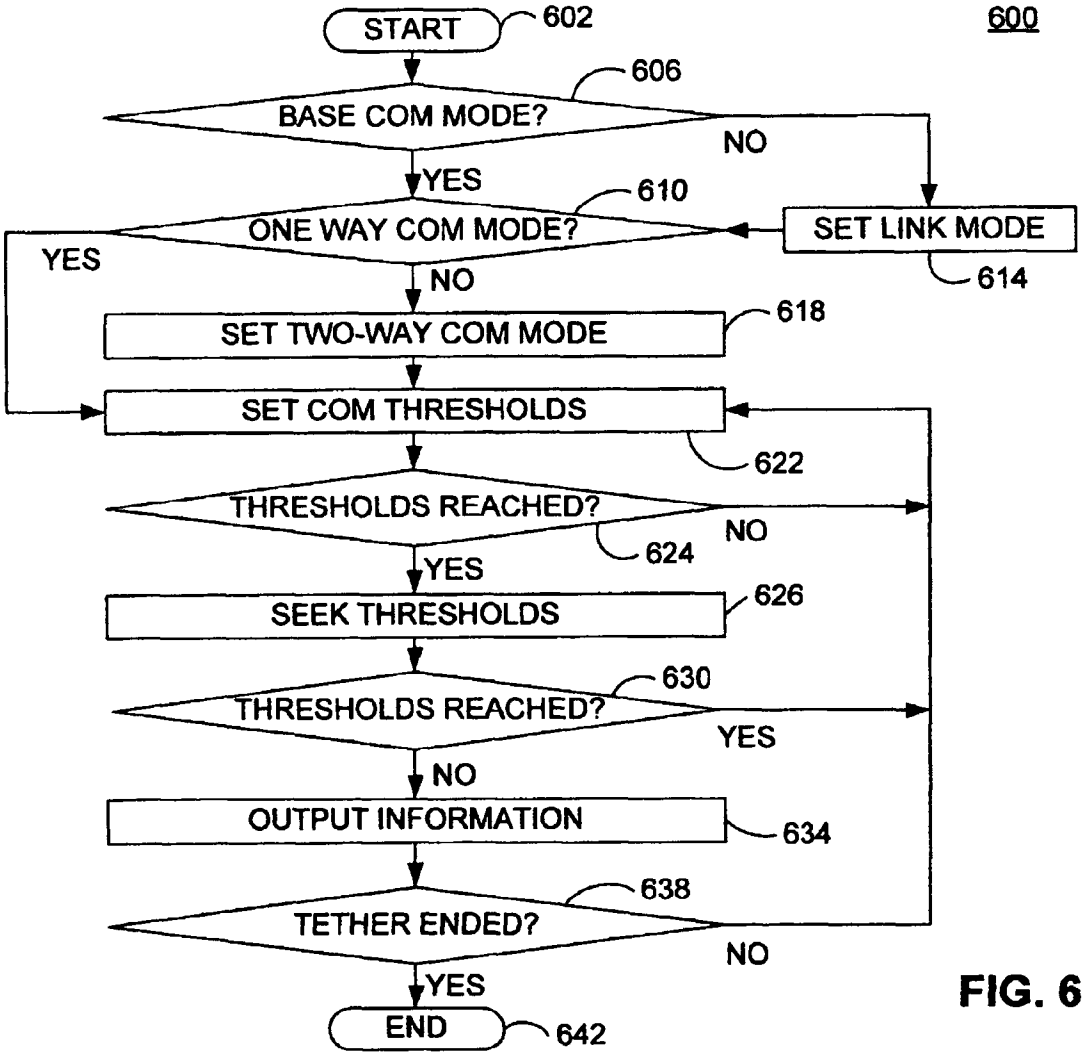
FIG. 6 is flow diagram of one embodiment of a method of wirelessly tethering devices together in accordance with one or more aspects of the present invention.

FIG. 6 is flow diagram of one embodiment of a method 600 of wirelessly tethering devices together in accordance with one or more aspects of the present invention. Method 600 is entered into when for example two or more wireless tether devices 100 are establishing a communication link. At 606, method 600 determines if a base mode has been set to establish one or more base stations as illustrated in FIG. 3 for example. If a base mode is not set, then at 614 link-mode is set to establish a link between tether devices such as shown in FIG. 4 and method 600 proceeds to 610. If at 606, a base mode is set then at 610 a check for one-way communication is made. If communication has been set to one way then method 600 proceeds to 622 described below. If, however, two-way communication is required, then at 610 method 600 moves to 618 and sets two-way communication mode.

At 622, communication thresholds are established. For example, for a wireless tether receiver configuration, communication detection would be the reception of one or more wireless tether signals. For two-way communication, communication detection may include detecting corresponding two-way communication using techniques such as handshake protocols, and the like. At 624, distance thresholds are checked, i.e. distance perimeters. If threshold is maintained, then method 600 returns to 622. If however, at least one distance threshold is not maintained, then at 626 method 600 attempts to determine if at least one perimeter threshold has been exceeded, or if communication has been compromised. Distance thresholds may be determined in a number of ways such as signal strength, Doppler, pulse modulation time differential, phase shifts, and other distance determining methods as are known in the art. Illustratively, as described above, communication may be tested and re-established in a plurality of ways. For example, if tether signals are lost, signal scanning as described above may be used to re-establish a signal connection. At 630, re-establishment of one or more distance thresholds is checked. If one or more distance thresholds are re-established, method 600 proceeds to 622. If one or more distance thresholds are not re-established then method 600 proceeds to 634. At 634, information is provided in response to the inability to reestablish distance threshold. For example, a user moves beyond a predefined perimeter from a base unit (e.g., see FIG. 3, wireless tether receiver 100RD), a signal may be given to the user from the wireless tether receiver 100 indicative thereof. As tether may be terminated between communicating devices, tether termination is checked for at 638. If tether termination has occurred, then method 600 moves to 642 and ends. If however, tether was not terminated then method 600 proceeds to 622.

While the foregoing is directed to embodiments of the present invention, other and further embodiments of the invention may be devised without departing from the basic scope thereof, and the scope thereof is determined by the claims that follow.

The invention claimed is:

1. A method of utilizing a wireless tether, the method comprising:

determining when an apparatus used to wirelessly tether a being or a machine in proximity thereof to a location has exceeded at least one distance threshold from the location; and when the apparatus exceeds the at least one distance threshold, providing an alert to the being, or the machine, or another party in proximity thereof, wherein the alert is configured to provide instruction meaningful to the being, or the machine, or the other party, on how to respond to the at least one distance threshold being exceeded.

2. The method of claim 1, wherein the apparatus comprises a portable device.

3. The method of claim 1, wherein the location comprises a geographic location.

4. The method of claim 1, wherein the instruction comprises information configured to be understandable to the being intellect or to the machine.

5. The method of claim 4, wherein the instruction comprises information conveyed using images, symbols, sound, vibration, light, and combinations thereof.

6. The method of claim 1, wherein the instruction comprises information provided by a transmitter operated by a second party.

7. The method of claim 1, further comprising after a predetermined time has elapsed after exceeding the at least one distance threshold, providing further instruction to the being, or the machine, or other party.

8. The method of claim 1, further comprising determining after a predetermined time has elapsed if the instruction has been followed by the being, or the machine, or the other party, or a third party.

9. A method of providing at least one wireless boundary about a geographic location, the method comprising:

determine a distance of a position location device from a geographic location; and when the position location device has exceeded a first distance from the geographic location, and after a predetermined time has elapsed after the position location device exceeded the first distance, providing an instructional alert to a being or machine in proximity of and movable with the position location device, wherein the instructional alert is configured to instruct the being, the machine, or another party in proximity of the position location device how to respond to exceeding the first distance.

10. The method of claim 9, wherein the instructional alert comprises intellectually meaningful instructions configured to inform the being or the machine that the position location device has exceeded the first distance, and inform the being or the machine how to move to within the first distance or to another geographic location.

11. The method of claim 10, wherein the intellectually meaningful information comprises instructions conveyed using at least one of symbols, sound, vibration light, and combinations thereof.

12. The method of claim 9, wherein the instructional alert comprises information received from a transmitter operated by a second party from another geographic location.

13. The method of claim 9, wherein the instructional alert comprises information outputted from an output device in proximity of the being, the machine, or to the other party.

14. The method of claim 9, wherein the first location comprises a movable second position location device configured to form a wireless tether with the first position location device and establish the geographic location.

15. A *non-transitory* computer-readable medium storing a set of code modules which when executed by a processor of a computer system cause the processor to operate a wireless tether, the computer-readable medium comprising:

code for determining when an apparatus used to wirelessly tether a being or a machine in proximity thereof to a location has exceeded at least one distance threshold from the location; and when the apparatus exceeds the at least one distance threshold, code for providing an alert to the being, or the machine, or another party in proximity thereof wherein the alert is configured to provide instruction meaningful to the being, or the machine, or the other party, on how to respond to the at least one distance threshold being exceeded.

16. The *non-transitory* computer-readable medium of claim 15, wherein the apparatus comprises a portable device.

17. The *non-transitory* computer-readable medium of claim 15, wherein the location comprises a geographic location.

18. The *non-transitory* computer-readable medium of claim 15, further comprising code for transmitting an emergency wireless signal over at least one wireless communication channel when the apparatus remains beyond the at least one distance threshold for a predetermined time.

19. The *non-transitory* computer-readable medium of claim 15, further comprising after a predetermined time has elapsed after exceeding the at least one distance threshold, code for providing further instruction to the being, or the machine, or the other party.

20. The *non-transitory* computer-readable medium of claim 15, further comprising code for determining after a predetermined time has elapsed if the instruction has been followed by the being, or the machine, or the other party, or a third party.

* * * * *